M. KÜLLER.
REMOVABLE RIM ATTACHMENT FOR VEHICLE WHEELS.
APPLICATION FILED DEC. 5, 1913.

1,107,080.

Patented Aug. 11, 1914.

Witnesses

Inventor
M. Küller
By
Atty.

UNITED STATES PATENT OFFICE.

MAX KÜLLER, OF BERLIN-LICHTERFELDE, GERMANY.

REMOVABLE-RIM ATTACHMENT FOR VEHICLE-WHEELS.

1,107,080.  Specification of Letters Patent.  Patented Aug. 11, 1914.

Application filed December 5, 1913. Serial No. 804,908.

*To all whom it may concern:*

Be it known that I, MAX KÜLLER, a subject of the Emperor of Germany, residing at 24 Dürerstrasse, Berlin-Lichterfelde, Germany, have invented new and useful Improvements in Removable-Rim Attachments for Vehicle-Wheels, of which the following is a specification.

This invention relates to improvements in means for attaching and detaching demountable rims.

The object of the invention is to provide a special form of hinged bolt and receiving nut, whereby when the bolt is withdrawn to attach or detach a rim, the bolt may be turned on its hinge and be retained in place for future use.

The invention also comprehends improvements in the construction and arrangement of parts which will be hereinafter described and particularly pointed out in the claims.

Figure 1:
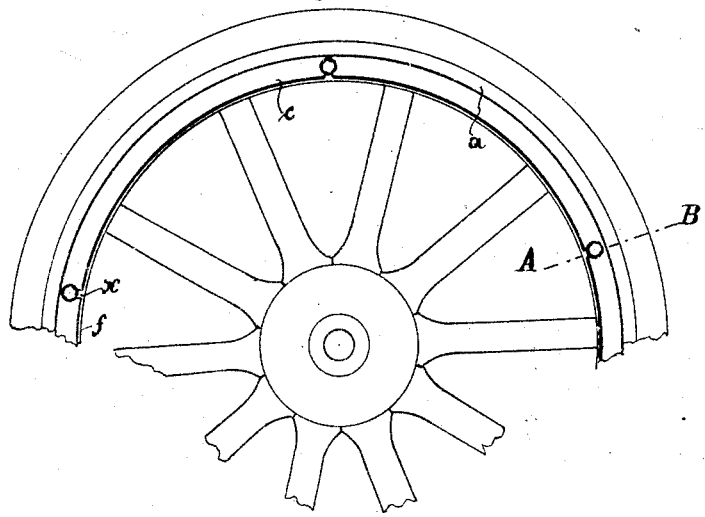
Figure 2:
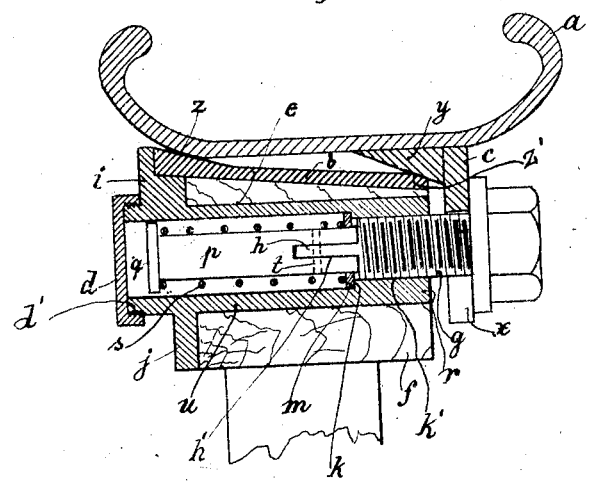

In the drawings:—Figure 1 is a side elevation of a portion of a wheel illustrating the use of the invention. Fig. 2 is an enlarged detail section on the line A—B of Fig. 1.

*a* indicates a demountable rim provided with an annular flange *c* formed on its inner edge with a series of open slots *x*, and adjacent the flange is an inclined bearing surface *y*.

*f* indicates the felly of a wheel, and on the periphery thereof is an inclined annular band *b*, provided near its opposite edges with abrupt inclined bearing surfaces *z* and *z'*, on which the felly is seated when in position, as clearly shown in Fig. 2. Mounted in openings *e* in the felly at suitable intervals are sleeves *u*, one for each slot *x*, the interior of each sleeve having a shoulder *k*. Each sleeve is formed with flanges *i* and *j* which engage the side of the felly, and intermediate of the flanges is a threaded extension *d'*, which receives a threaded cap *d*. The sleeve is interiorly threaded beyond the shoulder *k*, as indicated at *k'*. The inner end of the bolt is reduced to form a flat extension *h*, which fits in a slot *h'* in the inner end of a rod *p*, formed at its outer end with a head *q*. A pin *t* extends through the rod *p* and the flat extension *h* of the screw to form a hinge joint, for a purpose which will appear later on. A washer *m* is supported on the rod *p* and bears against the shoulder *k* and between this washer and the head *q* of the rod is a spring *s*, the tension of which is such as will tend to draw the rod and bolt into the sleeve.

To remove the rim from the felly, a wrench is applied to the head of the bolt *g*, to unscrew the latter from the sleeve, which movement obviously compresses the spring *s*. After the bolt has become disengaged from the threads *k'*, it is turned on the hinged joint in a direction of the center of the wheel, to free the bolt from the slot *x*. While it is true that the spring is at this time under compression and tends to draw the bolt into the sleeve, it will be retained in this position because the bolt is turned at right angle to disengage it from the slot, and cannot be drawn in under the influence of the spring until it is turned again to a horizontal position. After all the bolts have been disengaged from the slots, the rim may be removed in the usual manner. Upon replacing the rim of the felly, the bolts are turned on the hinges and into the slots *x*, to properly position the heads on the outside of the flange *c*. When the bolts are turned in the sleeves the springs materially assist in this operation as the tension is such as will tend to draw the bolts inwardly.

By my improved construction it will be seen that I provide means for detachably mounting a rim, which is always attached to the felly. In other words, when removing a rim, the bolts are never removed from the felly, hence the inconvenience and annoyance due to misplacing or loss of nuts and bolts is dispended with.

What I claim is:—

1. In combination, a felly, sleeves in the felly, each of said sleeves having a part internally threaded, a headed threaded bolt for each sleeve, a rod hinged to the bolt, the bolt and rod operating in the sleeve, a rim formed with open slots to receive the bolt, the head of the bolt engaging the rim to lock same on the felly and the hinge permitting of the bolt being turned out of said slot to remove the rim, and a flange coöperating with the head of the rod for preventing the withdrawal of the latter from the sleeve when the bolt is turned on the hinge.

2. In combination, a felly, a rim on the felly, said rim having open notches, a sleeve in the felly adjacent each notch, each of said sleeves having a threaded inner portion and a shoulder, a headed threaded bolt passing through the notch and engaging the threads in the sleeve, a rod hinged to the bolt and confined in the sleeve, and a spring in the sleeve which normally tends to draw the rod and bolt into said sleeve.

3. In combination, a felly, a sleeve in the felly, said sleeve having an inner threaded portion and a shoulder, a headed threaded bolt engaging the threaded portion of the sleeve, a rod hinged to the bolt, said rod having a head, a coil spring interposed between the shoulder and the head of the rod to normally draw the rod and bolt in the sleeve, and a rim having a slotted flange with which the head of the bolt engages.

4. In combination, a felly provided with a sleeve which is partially internally threaded, a headed bolt engaging the threaded portion of the sleeve, a rod hinged on the bolt and inclosed in the sleeve, a spring for normally tending to draw the bolt and rod in the sleeve, and means to prevent the rod being withdrawn from the opening.

5. In combination, a felly, a series of sleeves in the felly, each sleeve having a portion of the interior threaded and an inner shoulder, a headed threaded bolt engaging the threaded portion of the sleeve, a rod hinged to the bolt and inclosed in the sleeve, said rod having a head which with the shoulder in the sleeve prevents said sleeve being withdrawn from said rod, whereby when the bolt is unscrewed from the sleeve, it may be turned out of alinement with the rod to attach or detach a rim.

6. In combination, a felly having an opening, a hinged bolt headed at both ends and operating in the opening, means for attaching the hinged bolt to the felly, and means for normally tending to draw the hinged bolt in the opening, one of the heads serving to clamp a rim on the felly and the other head serving to prevent the hinged bolt dropping from the opening.

In testimony whereof I affix my signature in the presence of two witnesses.

MAX KÜLLER.

Witnesses:
HENRY HASPER,
WOLDEMAR HAUPT.